J. E. Richardson.

Chalk Line Spool.

N° 88,212.   Patented Mar. 23, 1869.

Witnesses.
Leopold Eberh
A. A. Leatman

Inventor.
John E. Richardson
per
Alexander & Mason
Attys

JOHN E. RICHARDSON, OF LOWELL, MICHIGAN.

Letters Patent No. 88,212, dated March 23, 1869; antedated March 18, 1869.

IMPROVEMENT IN CHALK-LINE SPOOLS.

The Schedule referred to in these Letters Patent and making part of the same

*To all whom it may concern:*

Be it known that I, JOHN E. RICHARDSON, of Lowell, in the county of Kent, and in the State of Michigan, have invented certain new and useful Improvements in "Chalk-Line Spools;" and do hereby declare that the following is a full, clear, and exact description thereof, reference being had to the accompanying drawings, and to the letters of reference marked thereon.

The nature of my invention consists in the construction and general arrangement of a "self-winding" and "self-chalking" chalk-line, enclosed in a covered box, the interior of which will be hereinafter more fully set forth.

In order to enable others skilled in the art to which my invention appertains to make and use the same, I will now proceed to describe its construction and operation, referring to the annexed drawings, which form a part of this specification, and in which—

Figure 1:
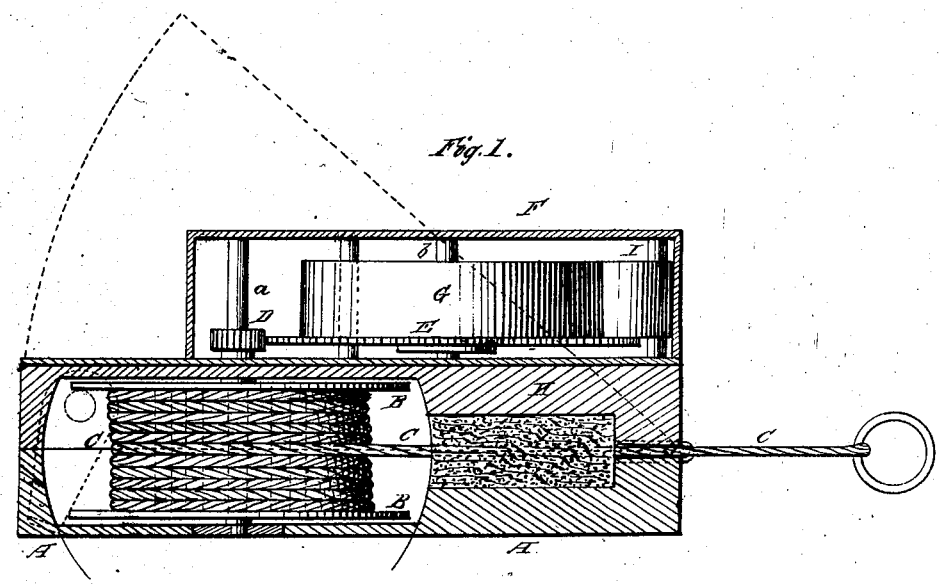
Figure 2:
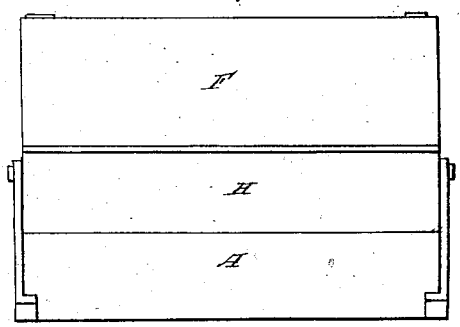

Figure 1 is a side view in section, and
Figure 2, an end view.

A represents an oblong box, the lid of which is hinged at one end, and fastened at the other by means of clamps, as seen in fig. 2, or other suitable means.

Inside of the box A is a spool, B, the shaft $a$ of which rests in the bottom of the box, and extends upward through a hole in the top of the same.

On the spool B, the chalk-line C is wound, said line passing through wool, or other material, filled with fine chalk, placed in a chamber, H, in the front end of the box, from which the line passes out through a hole in that end of the same.

The shaft $a$, above the box, is provided with a pinion, D, which gears into the cogs on a wheel, E, the shaft $b$ of which has its bearings in the top of the box A and in the cap F, completely covering a part of the top of said box.

The spring G, which is secured to the shaft $b$, and wound around above the cog-wheel E, its other end being secured to a pin, or bolt, I, as shown in fig. 1, is so arranged that when pulling the chalk-line C, and unwinding it from the spool B, the pinion D at the same time turning the cog-wheel E, the spring G is wound up on its shaft; and as soon as the force is removed from the line C, the spring unwinds, and at the same time winds up the line.

It will thus be seen that I have a completely self-acting chalk-line, both self-winding and self-chalking; and being completely covered, or enclosed, is not exposed to or liable to become damp, or wet.

Having thus fully described my invention,

What I claim as new, and desire to secure by Letters Patent, is—

The hinged box A, containing the line-spool B, and chalk-chamber H, with packing, and having attached the cap F, enclosing spring G, and wheels E D, all arranged to operate substantially as herein set forth.

In testimony that I claim the foregoing, I have hereunto set my hand, this 25th day of July, A. D. 1868.

JOHN E. RICHARDSON.

Witnesses:
THOMAS J. SLAYTON,
ARVINE PECK.